(12) United States Patent
Fang et al.

(10) Patent No.: US 11,718,970 B2
(45) Date of Patent: Aug. 8, 2023

(54) MONOPILE FOUNDATION GUIDING DEVICE

(71) Applicant: JIANGSU GOLDWIND SCIENCE & TECHNOLOGY CO., LTD., Yancheng (CN)

(72) Inventors: Jing Fang, Yancheng (CN); Huihuang Yan, Yancheng (CN); Jiuhua Wang, Yancheng (CN)

(73) Assignee: JIANGSU GOLDWIND SCIENCE & TECHNOLOGY CO., LTD., Yancheng (CN)

( * ) Notice: Subject to any disclaimer, the term of this patent is extended or adjusted under 35 U.S.C. 154(b) by 0 days.

(21) Appl. No.: 17/757,898

(22) PCT Filed: Oct. 10, 2020

(86) PCT No.: PCT/CN2020/120148
§ 371 (c)(1),
(2) Date: Jun. 23, 2022

(87) PCT Pub. No.: WO2021/129043
PCT Pub. Date: Jul. 1, 2021

(65) Prior Publication Data
US 2023/0051368 A1 Feb. 16, 2023

(30) Foreign Application Priority Data

Dec. 24, 2019 (CN) .......................... 201911345913.6

(51) Int. Cl.
*E02D 13/04* (2006.01)

(52) U.S. Cl.
CPC .................................. *E02D 13/04* (2013.01)

(58) Field of Classification Search
CPC ................... E02D 13/04; E02D 27/425; E02B 2017/0065; E02B 2017/0091
See application file for complete search history.

(56) References Cited

U.S. PATENT DOCUMENTS

| 2013/0227898 A1 | 9/2013 | Fairbairn et al. |
| 2020/0347960 A1 | 11/2020 | Roodenburg et al. |

FOREIGN PATENT DOCUMENTS

| CN | 2895525 Y | 5/2007 |
| CN | 201003167 Y | 1/2008 |

(Continued)

OTHER PUBLICATIONS

First Office Action in related Chinese Application No. 201911345913.6 dated Dec. 3, 2021 (15 pages).

(Continued)

*Primary Examiner* — Sean D Andrish
(74) *Attorney, Agent, or Firm* — Bayes PLLC (57) ABSTRACT

A monopile foundation guiding device is provided. The monopile foundation guiding device includes at least one guiding unit; each of the at least one guiding unit includes a single driving unit, a transmission unit, and a clamping unit; the clamping unit includes at least two clamping arms, and a clamping space for clamping a monopile foundation is formed between the at least two clamping arms; the single driving unit transmits power to the transmission unit, and the at least two clamping arms are driven to operate synchronously by means of the transmission unit, so that the clamping unit is opened or closed.

20 Claims, 9 Drawing Sheets

(56) References Cited

FOREIGN PATENT DOCUMENTS

| | | | |
|---|---|---|---|
| CN | 201214790 | Y | 4/2009 |
| CN | 102407004 | A | 4/2012 |
| CN | 102660950 | A | 9/2012 |
| CN | 103590402 | A | 2/2014 |
| CN | 204475334 | U | 7/2015 |
| CN | 205203293 | U | 5/2016 |
| CN | 206825649 | U | 1/2018 |
| CN | 108708379 | A | 10/2018 |
| CN | 110130349 | A | 8/2019 |
| CN | 110468840 | A | 11/2019 |
| DE | 102010009916 | A1 | 9/2011 |
| EP | 3517479 | * | 7/2019 |
| JP | 2000212960 | A | 8/2000 |
| JP | 2001151475 | A | 6/2001 |
| JP | 2007032017 | A | 2/2007 |
| WO | 2019125172 | A2 | 6/2019 |
| WO | 2019172752 | A2 | 9/2019 |

OTHER PUBLICATIONS

Extended European Search Report in related European Application No. 20904997.2 dated Dec. 6, 2022 (8 pages).

\* cited by examiner

MONOPILE FOUNDATION GUIDING DEVICE

CROSS-REFERENCE TO RELATED APPLICATIONS

This application is a national stage of International Application No. PCT/CN2020/120148, filed on Oct. 10, 2020, which claims priority to Chinese Patent Application No. 201911345913.6, filed on Dec. 24, 2019. The entire contents of each of the above-identified applications are expressly incorporated herein by reference.

TECHNICAL FIELD

The present disclosure relates to the technical field of offshore wind power generation, and in particular to a monopile foundation guiding device for offshore wind turbines.

BACKGROUND

Among all kinds of wind turbine foundations used in offshore wind turbines, the monopile foundation not only has the advantages of simple manufacture and low equipment cost, but also has the advantages of superior construction efficiency. Therefore, more than 90% of offshore wind turbines adopt monopile foundations.

However, wind turbines have extremely high requirements on the verticality of the monopile foundation, and the maximum height difference of the plane in a circumferential direction needs to be less than the set value. In the process of hammering the monopile foundation to be put into the seabed, if there is a hammering deviation, the monopile foundation is likely to be scrapped. Considering the repair plan is implemented in the later stage, or the transition flange of monopile foundation is reconnected to correct the verticality besides the cost of offshore construction ships and cranes, it may result in huge costs. Therefore, verticality control is the key in the construction of monopile foundation.

In the conventional technology, some monopile foundation guiding devices adopt multiple-cylinder structures to clamp the monopile foundation at several positions, which results in difficulty in synchronous operation and low verticality synchronous control precision. On the other hand, since multiple cylinders need to be controlled by multiple people, an extension length of each cylinder needs to be measured every time during the construction of a monopile foundation. In the process of hammering a monopile, it is necessary to pay attention to the stress of each cylinder at any time. Every time the monopile is sunk to a certain height, it is necessary to stop the hammer and measure the verticality. If there is a deviation, it is required to push each cylinder separately to adjust the verticality of the monopile again, so the operation process is complicated, and the efficiency is low.

In addition, in the monopile foundation guiding device of conventional technology, the cylinders are mounted on the top of the platform, and the operator needs to climb to the top of the platform to operate the cylinder and measure the extension length of the cylinder, so there is a risk of falling.

SUMMARY

An object according to the present disclosure is to provide a monopile foundation guiding device which is simple to operate with high safety performance and is capable of accurately controlling the verticality of the monopile foundation.

According to an aspect of the present disclosure, a monopile foundation guiding device is provided, which includes at least one guide unit. Each of the at least one guide unit includes a single drive unit, a transmission unit and a clamping unit. The clamping unit includes at least two clamping arms, and a clamping space for clamping the monopile foundation is formed between the at least two clamping arms. The single drive unit transmits power to the transmission unit. The transmission unit drives the at least two clamping arms to operate synchronously to open or close the clamping unit.

According to one aspect of the present disclosure, the at least one guide unit includes a first guide unit. The first guide unit includes a first drive unit, a first transmission unit and a first clamping unit. The first transmission unit includes a push block. The first drive unit pushes the push block to move, so that the first clamping unit is driven to be closed to hold the monopile foundation tightly. According to one aspect of the present disclosure, the at least one guide unit includes a second guide unit, which includes a second drive unit, a second transmission unit and a second clamping unit. The second transmission unit includes an annular frame, the second clamping unit includes multiple clamping arms, and the multiple clamping arms are inserted into the annular frame. The second drive unit pushes the annular frame to rotate, thereby driving the multiple clamping arms to pivot synchronously through the annular frame.

In the present disclosure, the traditional pushing form with three or four cylinders, in which the clamping arms are respectively controlled, is abandoned. Instead, a single drive structure is adopted, where each clamping arm pivots synchronously and concentrically, and thus it can realize the precise control of verticality in the process of monopile construction. In addition, it has the advantages of simple operation with force stability, and is safe and reliable.

BRIEF DESCRIPTION OF DRAWINGS

The above and other objects and features of the present disclosure will become clearer through the following description in conjunction with the drawings.

DETAILED DESCRIPTION

In order to solve the problem in the conventional technology that multiple hydraulic cylinders respectively drive multiple clamping arms, and thus the clamping arms cannot move synchronously and coaxially, and the verticality synchronous control precision is low, a monopile foundation guiding device is provided according to the present disclosure. The monopile foundation guiding device includes at least one guide unit, each guide unit may include a single drive unit, a transmission unit and a clamping unit. The power is transmitted to the transmission unit by a single drive unit, and at least two clamping arms of the clamping unit are driven by the transmission unit to operate synchronously, so that multiple clamping arms of the clamping unit can be opened or closed at the same time, thus ensuring the verticality synchronous control accuracy of the monopile foundation.

Hereinafter, embodiments of the present disclosure are described in detail with reference to the accompanying drawings.

FIG. 1 to FIG. 5 are schematic structural diagrams of a monopile foundation guiding device according to the first embodiment of the present disclosure.

Figure 1:
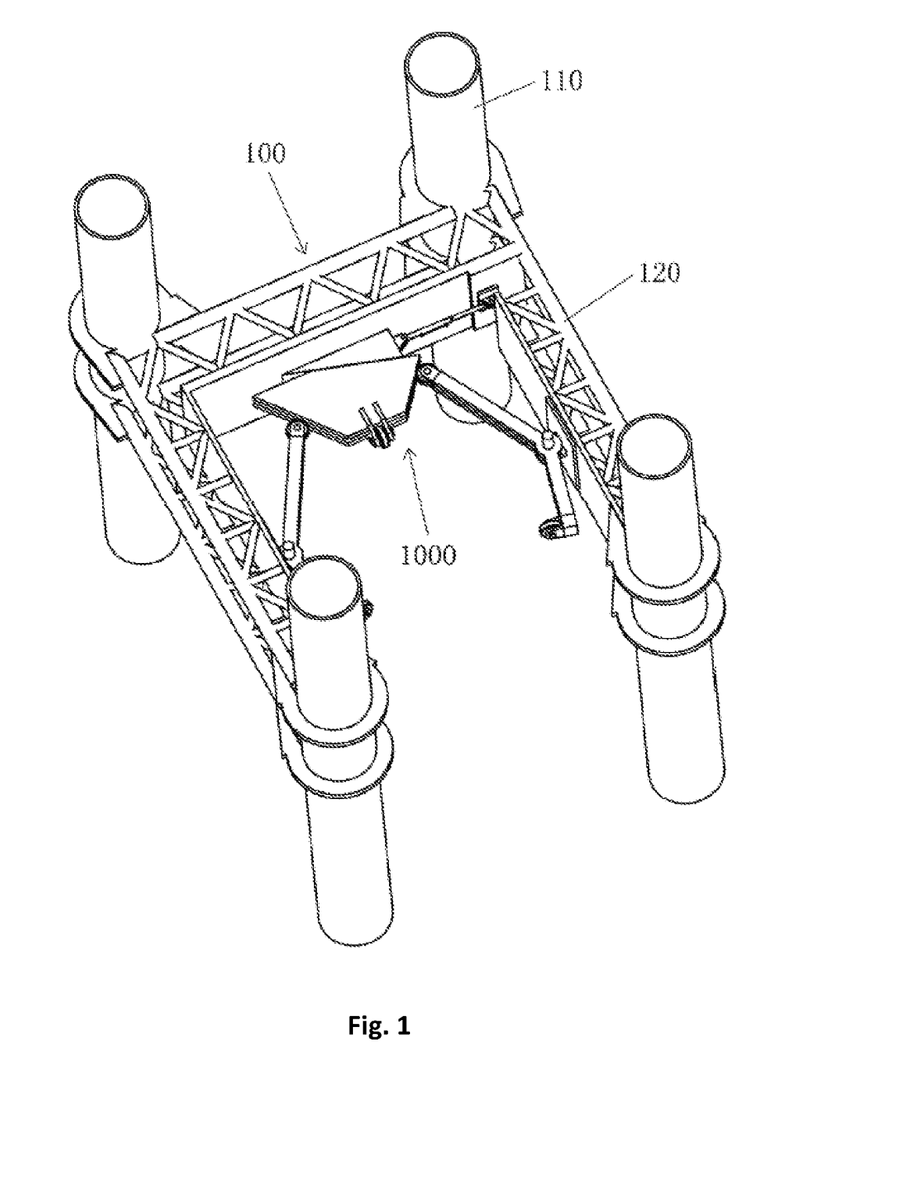
FIG. 1 is a perspective view of a monopile foundation guiding device according to a first embodiment of the present disclosure.

The monopile foundation guiding device according to the first embodiment of the present disclosure includes a guide support frame 100 and a first guide unit 1000 disposed on the guide support frame 100.

Figure 2:
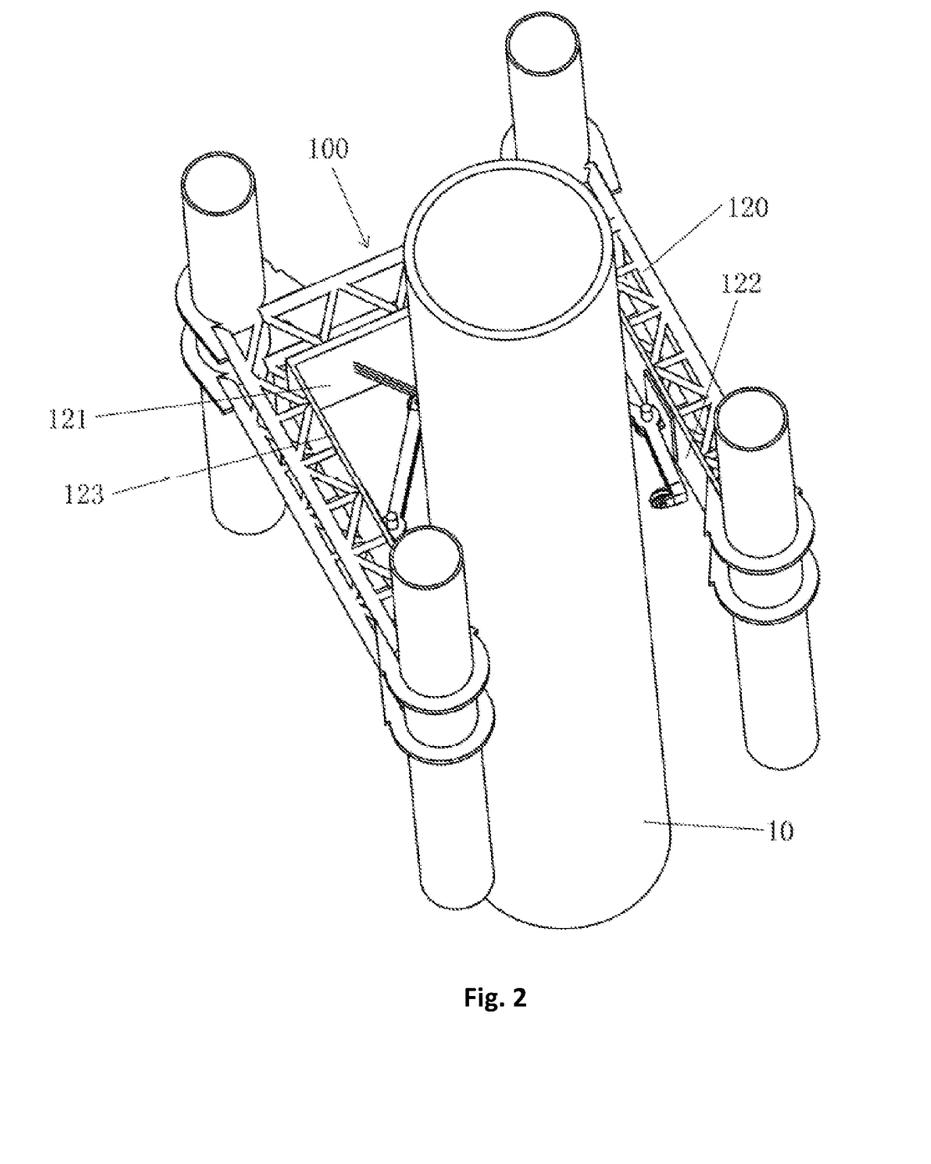
FIG. 2 is a state diagram of a monopile foundation construction using the monopile foundation guiding device according to the first embodiment of the present disclosure.

As shown in FIG. 1 and FIG. 2, the guide support frame 100 includes multiple positioning piles 110 and a first support platform 120 fixed on the positioning piles 110. The positioning pile 110 is a columnar structure, and the first support platform 120 is welded or bolted to the positioning pile 110. The positioning pile 110 can be connected with the hull or put into the seabed to form a stable support structure. In the embodiment of the present disclosure, there are four positioning piles 110, which are surrounded in a rectangular shape. The first support platform 120 is formed as a rectangular frame with one side open, and the four corners of which are respectively fixedly connected with the positioning piles 110. However, the number of the positioning piles 110 of the guide support frame 100 of the present disclosure is not limited to this, and the positioning piles 110 may be at least three. The shape of the first support platform 120 is not limited to a rectangle, and may also be a circle or a semicircle as long as a space suitable for mounting the first guide unit 1000 is formed inside.

The first guide unit 1000 is mounted on the first support platform 120. The first support platform 120 is formed into a concave structure with one side open. The first guide unit 1000 is mounted in the recess of the first support platform 120, and is used for guiding the monopile foundation 10 when hoisting the monopile foundation 10, and in the process of hammering the monopile foundation, the first guide unit 1000 applies clamping force to the monopile foundation 10 to ensure the verticality of the monopile foundation 10.

Figure 3:
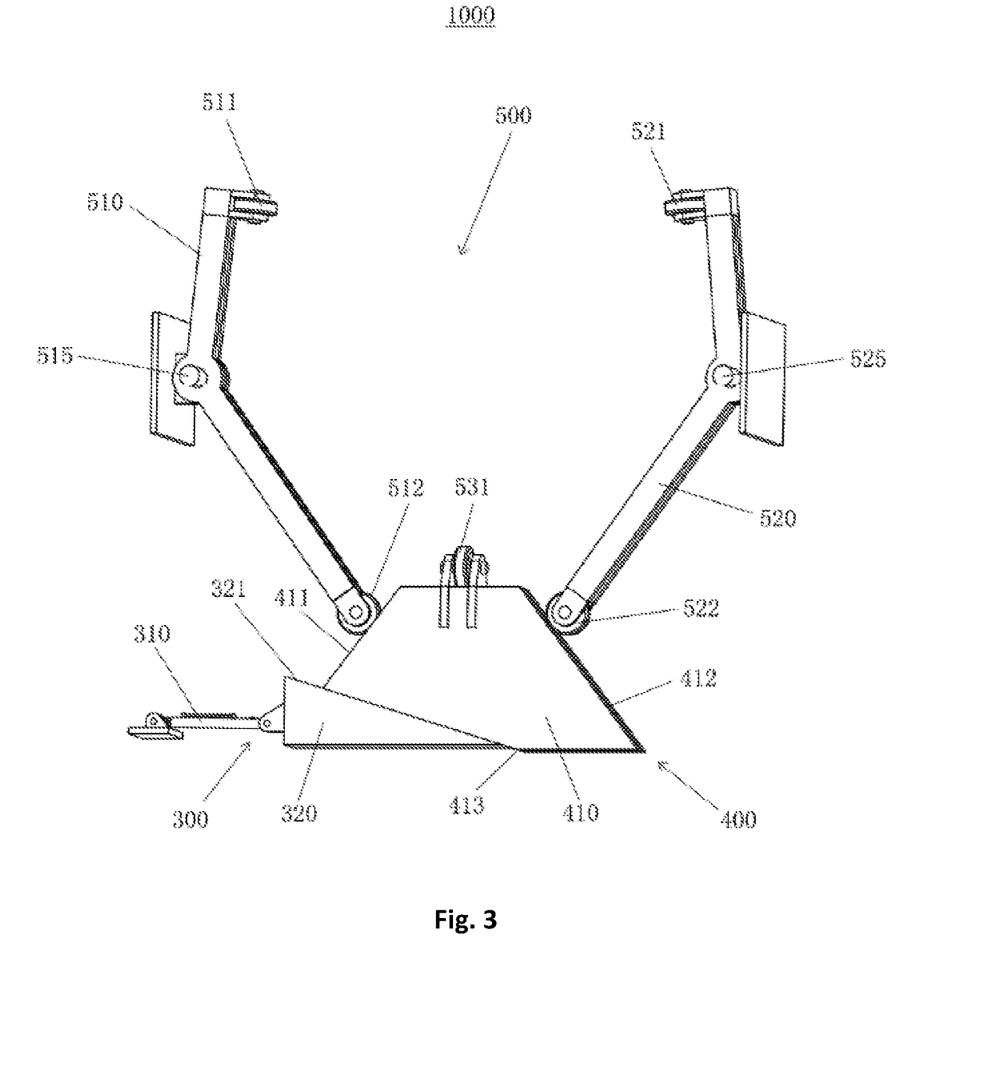
FIG. 3 is a perspective view of a first guide unit of the monopile foundation guiding device according to the first embodiment of the present disclosure.
Figure 4:
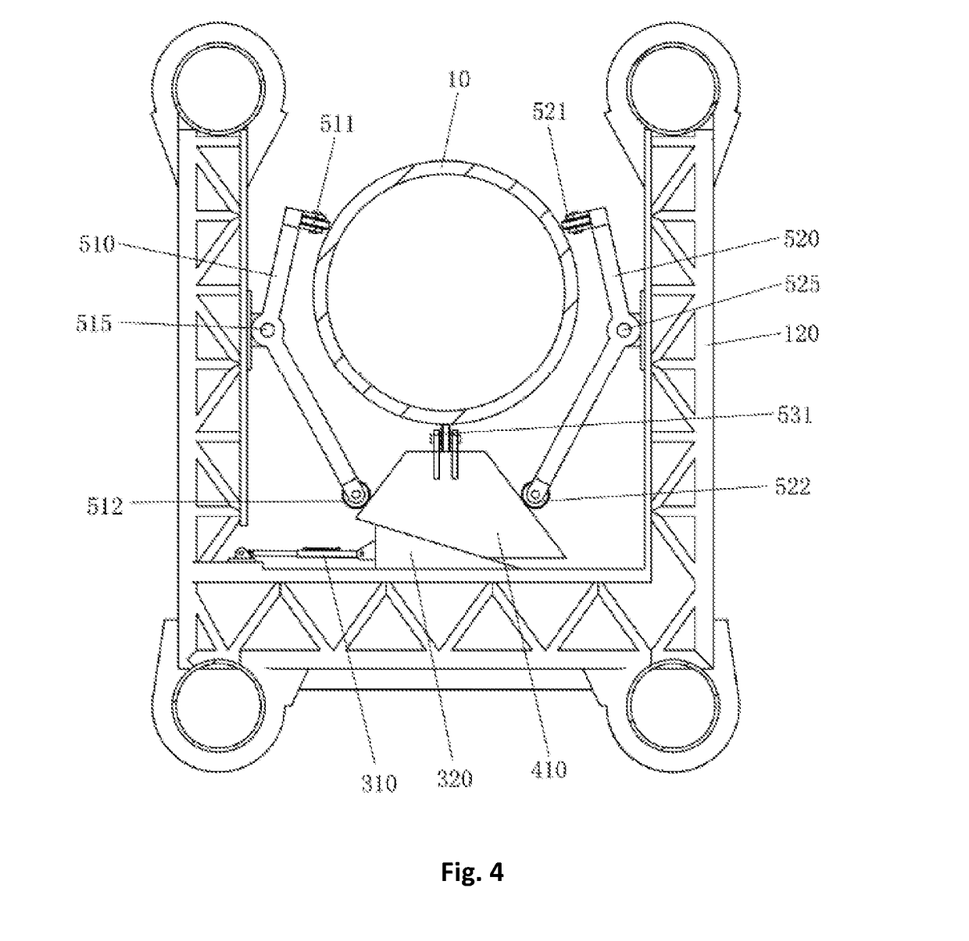
FIG. 4 is a top view of the first guide unit of the monopile foundation guiding device according to the first embodiment of the present disclosure, where the first clamping unit is in a closed state.
Figure 5:
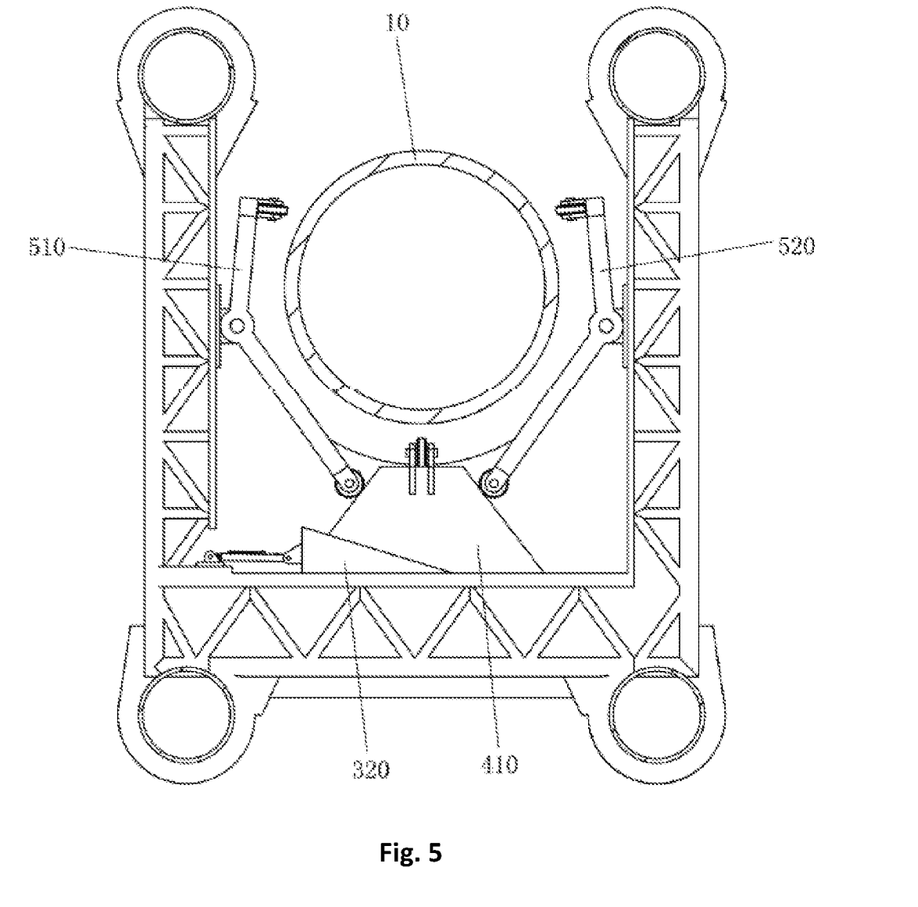
FIG. 5 is the top view of the first guide unit of the monopile foundation guiding device according to the first embodiment of the present disclosure, where the first clamping unit is in an open state.

As shown in FIG. 3 to FIG. 5, the first guide unit 1000 may include a first drive unit 300, a first transmission unit 400 and a first clamping unit 500. The first clamping unit 500 has a clamping space for accommodating the monopile foundation 10. The first drive unit 300 transmits the driving force to the first transmission unit 400, and the first clamping unit 500 is driven to close or open by the first transmission unit 400 to grip or release the monopile foundation 10. Hereinafter, the specific structure of the first guide unit 1000 is described in detail.

The first clamping unit 500 may include a first clamping arm 510 and a second clamping arm 520. The first clamping arm 510 and the second clamping arm 520 may have a symmetrical structure, and an accommodation space for accommodating the monopile foundation 10 is formed between the first clamping arm 510 and the second clamping arm 520. As an example, the inner side wall of the first support platform 120 can include a first inner side wall 121, and a second inner side wall 122 and a third inner side wall 123 which are located on both sides of the first inner side wall 121. The first clamping arm 510 and the second clamping arm 520 can be mounted on the second inner side wall 122 and the third inner side wall 123 of the first support platform 120, respectively.

A first pressing roller 511 may be provided on the first end of the first clamping arm 510, and a first support roller 512 may be provided on the second end of the first clamping arm 510. The first clamping arm 510 may be hinged with the first support platform 120. Specifically, the first clamping arm 510 may be a rigid bend link, which is hinged to the second side wall 122 of the first support platform 120 through the first hinge shaft 515 at the middle position of the rigid bend link. The first clamping arm 510 can pivot about the first hinge shaft 515 within a certain angle range.

A second pressing roller 521 may be provided on the first end of the second clamping arm 520, and a second support roller 522 may be provided on the second end of the second clamping arm 520. The second clamping arm 520 may be hinged with the first support platform 120. Specifically, the second clamping arm 520 may be a rigid bend link, which is hinged to the third side wall 123 of the first support platform 120 through the second hinge shaft 525 at the middle position of the rigid bend link. The second clamping arm 520 can pivot about the second hinge shaft 525 within a certain angle range.

The first transmission unit 400 may include a push block 410. The first drive unit 300 pushes the push block 410 to move toward the clamping space of the first clamping unit 500, thereby driving the first clamping unit 500 to be closed to hold the monopile foundation 10 tightly. A limit mechanism can be set on the first support platform 120 to limit the movement track of the push block 410. For example, a groove is provided on the first support platform 120, and a protrusion matching the groove is provided on the lower surface of the push block 410, so that the protrusion is engaged in the groove and can move in the groove. The movement of the push block 410 is guided by the limit mechanism, so that the push block 410 can only move along a specific trajectory, so as to apply a stable driving force to the first clamping unit 500.

The push block 410 may include a first pyramidal surface 411 and a second pyramidal surface 412 which are oppositely disposed. Specifically, the distance between the first pyramidal surface 411 and the second pyramidal surface 412 is tapered toward the clamping space, so that the top of the cone formed by the push block 410 faces the clamping space. The first clamping arm 510 is abutted against the first pyramidal surface 411 through the first support roller 512, and the second clamping arm 520 is abutted against the second pyramidal surface 412 through the second support roller 522. The first support roller 512 can roll along the first pyramidal surface 411, and the second support roller 522 can roll along the second pyramidal surface 412.

When the first drive unit 300 pushes the push block 410 toward the clamping space, the first pyramidal surface 411 and the second pyramidal surface 412 on both sides of the push block 410 respectively transmit forces to the first support roller 512 and the second support roller 522, thereby pushing the first clamping arm 510 and the second clamping arm 520 to pivot around the hinge shafts 515 and 525, respectively. Meanwhile, the first pressing roller 511 and the second pressing roller 521 move toward the clamping space to adjust the volume of the clamping space or adjust the pressing force on the monopile foundation 10.

In addition to the first clamping arm 510 and the second clamping arm 520, the first clamping unit 500 may further include a third clamping arm. The third clamping arm can be fixedly mounted on the push block 410, and located on the side of the push block 410 facing the clamping space. A third pressing roller 531 can be mounted on the third clamping arm. In the example shown in the Figures, the third clamping arm is short and formed as a roller bracket for mounting the third pressing roller 531 on the push block 410. The roller bracket may be fixed by welding with the push block 410.

When the push block 410 moves toward the clamping space, the first pressing roller 511, the second pressing roller 521 and the third pressing roller 531 can move synchronously and coaxially. The three rollers are abutted against the outer surface of the monopile foundation 10, and at the same time apply a gripping force to the monopile foundation 10, so that the monopile foundation 10 is subjected to a symmetrical pressing force in the circumferential direction to ensure the verticality of the monopile foundation 10.

Although in the embodiment of the present disclosure, a third clamping arm is further provided, the third clamping arm is not necessary. For example, one end of the first clamping arm 510, where the first pressing roller 511 is mounted, may be formed with an arc-shaped clamping plate to surround a part of an outer circumference of the monopile foundation at an outer side of the monopile foundation. An inner surface of the arc-shaped clamping plate may also be provided with multiple pressing rollers, to be in rolling contact with the outer surface of the monopile foundation through the multiple pressing rollers. Correspondingly, the end of the second clamping arm 520, where the second pressing roller 521 is mounted, is also formed with an arc-shaped clamping plate, and multiple pressing rollers may also be mounted on the inner side of the arc-shaped clamping plate. When the push block 410 pushes the first clamping arm 510 and the second clamping arm 520 to pivot and be closed, the two arc-shaped clamping plates symmetrically press the monopile foundation from both sides, thereby holding the monopile foundation tightly and ensuring the verticality of the monopile foundation.

According to the embodiment of the present disclosure, the push block 410 is driven by a single drive unit 300, and multiple clamping arms are driven by the push block 410 to operate synchronously, so that multiple pressing rollers simultaneously are abutted against the outer surface of the monopile foundation 10. In the present disclosure, the structure and mounting position of the first drive unit 300 are not limited, as long as the first drive unit 300 can push the push block 410 to move toward the clamping space and push the first clamping arm 510 and the second clamping arm 520 to pivot synchronously.

According to the first embodiment of the present disclosure, an example of implementing the first drive unit 300 is provided.

As shown in FIG. 3 to FIG. 5, the push block 410 further includes a first inclined surface 413. The first pyramidal surface 411 and the second pyramidal surface 412 are located on both sides of the first inclined surface 413. In other words, the first inclined surface 413 is formed on the side of the push block 410 facing away from the clamping space. The first drive unit 300 includes a hydraulic cylinder 310 and a wedge 320 connected to one end of the hydraulic cylinder. The wedge 320 has a second inclined surface 321, the second inclined surface 321 and the first inclined surface 413 face and contact with each other. When the hydraulic cylinder 310 extends to push the wedge 320 to move in the first direction, the wedge 320 pushes the push block 410 to move in the second direction. Both the first direction and the second direction are in the horizontal plane and perpendicular to the axial direction of the monopile foundation.

The first drive unit 300 may be mounted on the first inner side wall 121 of the first support platform 120. The wedge 320 can slide along the first direction on the first inner side wall 121, to convert the driving force of the hydraulic cylinder 310 in the first direction into the power for the push block 410 of being moved in the second direction.

To stably control the movement paths of the wedge 320 and the push block 410, protrusions may be provided on the wedge 320 and the push block 410, respectively, and corresponding grooves may be provided on the first support platform 120, respectively. The movement paths of the wedge 320 and the push block 410 are guided by arranging the protrusions in the grooves.

The three pressing rollers 511, 521 and 531 can be evenly and symmetrically arranged along the outer circumference of the monopile foundation 10. In this case, the taper of the first pyramidal surface 411 and the second pyramidal surface 412 of the push block 410 can be designed so that the three pressing rollers 511, 521 and 531 exert the same pressing force on the monopile foundation 10. In addition, an inclination angle of the surface of the push block 410 facing the clamping space can also be adjusted. In addition, the three pressing rollers are not necessarily arranged uniformly, as long as the forces of the monopile foundation 10 in all directions can be symmetrical.

Although not shown in the drawings, it is understood that the first support platform 120 may further include a horizontal support plate for supporting the first drive unit 300 and the first transmission unit 400. Specifically, a horizontal support plate can be provided below the push block 410 and the wedge 320 to support the bottom surfaces of the push block 410 and the wedge 320, so that the push block 410 and the wedge 320 can stably slide in the horizontal direction.

The first support roller 512 is rotatable supported on the first pyramidal surface 411 of the push block 410, and the second support roller 522 is rotatable supported on the second pyramidal surface 412 of the push block 410. As the push block 410 moves toward the clamping space, the push block 410 pushes the first support roller 512 and the second support roller 522 toward both sides through the first pyramidal surface 411 and the second pyramidal surface 412, respectively, and drives the first clamping arm 510 and the second clamping arm 520 to pivot around the hinge shafts 515 and 525, so that the first pressing roller 511 and the second pressing roller 521 move inward relative to the clamping space to be abutted against the outer surface of the monopile foundation 10, and exert a clamping force on the monopile foundation 10. Meanwhile, as the push block 410 moves toward the clamping space, the third pressing roller 531 mounted on the push block 410 also comes to the outer surface of the monopile foundation 10, and exerts a clamping force on the monopile foundation 10 with the first pressing roller 511 and the second pressing roller 521. By adjusting the extension length of the hydraulic cylinder 310, the volume of the clamping space and the clamping force applied to the monopile foundation 10 can be adjusted. FIG. 4 shows a schematic diagram in which the first clamping unit 500 is closed to apply a clamping force to the monopile foundation 10.

As an optional example, the wedge 320 may be a triangular wedge, preferably a right-angled triangular wedge. Specifically, a cross-sectional shape of the wedge 320 may be a right-angled triangle, and the long right-angled side (also referred to as the bottom side) of the triangle faces and contacts with the first inner side wall 121 of the first support platform 120 so as to slide on the first inner side wall 121. The short right-angled side of the triangle is perpendicular to the first inner side wall 121, and the first drive unit 300 can be connected to the short right-angled side of the wedge 320. The inclined surface (i.e., the second inclined surface 321) of the wedge 320 corresponding to the oblique side of the triangle faces and contacts with the first inclined surface 413 of the push block 410. The push block 410 is located between the wedge 320 and the clamping space.

As an example, an inclination angle of the first inclined surface 413 and the second inclined surface 321 may be 10°-30°, preferably 20°. In case that the inclination angle is small, the contact area between the first inclined surface 413 and the second inclined surface 321 is large, the cylinder stroke is large, and thus the adjustment speed is slow. In case that the inclination angle is large, the contact area between the first inclined surface 413 and the second inclined surface 321 is small, the cylinder stroke is small, and thus the adjustment speed is fast. Therefore, the inclination angles of the first inclined surface 413 and the second inclined surface 321 may be set according to adjustment requirements.

When the hydraulic cylinder extends, the wedge 320 pushes the push block 410 outward, and pushes the push block 410 away from the first inner side wall 121 to move toward the clamping space of the first clamping unit 500. When the hydraulic cylinder 310 is retracted, the wedge 320 is retracted, thereby withdrawing the pushing force on the push block 410.

As the wedge 320 is retracted, the push block 410 is also required to be retracted. To enable the push block 410 to follow the wedge 320 to retreat backward, the two inclined surfaces 321 and 413 abutting the wedge 320 and the push block 410 can be provided with a sliding groove and a sliding rail, respectively. The sliding rail can be engaged in the sliding groove, so that the wedge 320 and the push block 410 can be connected to each other in a movable manner, so that the push block 410 can move together with the wedge 320. When the wedge 320 retreats, the push block 410 can also retreat toward the first inner side wall 121 and away from the clamping space.

However, according to the embodiment of the present disclosure, the manner of retreating the push block 410 is not limited to this. A return spring may also be provided on the first inner side wall 121 to apply a pulling force to the push block 410, so that when the wedge 320 retreats, the push block 410 may also move toward the first inner side wall 121 under the pulling force of the return spring.

When the hydraulic cylinder 310 is retracted, the push block 410 gradually approaches the first inner side wall 121, so that the third pressing roller 531 leaves the outer surface of the monopile foundation 10 and the pressing force on the monopile foundation 10 is removed. As the push block 410 retreats, the pushing force on the first support roller 512 by the push block 410 is removed and the second support roller 522, the first clamping arm 510 and the second clamping arm 520 are pivoted to be open. The clamping force on the monopile foundation 10 by the first pressing roller 512 and the second pressing roller 522 is also removed. FIG. 5 shows a schematic view of the first clamping unit 500 in an open state.

In order that the first clamping arm 510 and the second clamping arm 520 can automatically pivot outward to open when the first drive unit 300 retracts, a return spring may be provided on the first hinge shaft 515 and the second hinge shaft 525, so that when the push block 410 retreats so that the pushing force on the first support roller 512 and the second support roller 522 is removed, the outer ends of the first clamping arm 510 and the second clamping arm 520 can be opened outwards under the elastic force of the return spring. In addition, return springs may also be provided on the second inner side wall 122 and the third inner side wall 123. When a return spring for pivotally opening the first clamping arm 510 and the second clamping arm 520 is provided, it is unnecessary to provide a part for retracting the push block 410 backward. The push block 410 can be pushed back by the first support roller 512 and the second support roller 522.

As an optional solution, roller grooves may also be provided on the first pyramidal surface 411 and the second pyramidal surface 412, and the first support roller 512 and the second support roller 522 are embedded in the roller grooves. The first support roller 512 and the second support roller 522 can be engaged in the roller groove and can roll in the roller groove. By being engaged in the roller groove, the first support roller 512 and the second support roller 522 cannot be disengaged from the first pyramidal surface 411 and the second pyramidal surface 412 of the push block 410. Therefore, when the push block 410 is away from the clamping space, the first support roller 512 and the second support roller 522 roll along the first pyramidal surface 411 and the second pyramidal surface 412 toward the top of the push block 410, so that the first clamping arm 510 and the second clamping arm 520 pivot around the hinge shafts 515 and 525, respectively, to open the clamping space.

During the sink of the monopile foundation 10, there is a downward force. According to the embodiment of the present disclosure, the multiple clamping arms are all in contact with the monopile foundation 10 through rollers. The rollers roll downward along the outer wall of the monopile foundation 10, reducing friction on the outer surface of the monopile foundation 10, reducing the vibration impact force on the support platform, reducing safety risks, and thus increasing the stability of the structure. In the first embodiment according to the present disclosure, the rolling paths of the rollers are designed in horizontal and vertical directions. The rolling path of the roller in contact with the monopile foundation 10 is in the vertical direction, and the rolling path of the roller in contact with the push block 410 is in the horizontal direction.

The monopile foundation guiding device of the first embodiment disclosed in the present disclosure can realize the synchronous coaxial movement of multiple pressing rollers of the first clamping unit 500 through a single drive unit 300. When the hydraulic cylinder is used for driving, only one cylinder needs to be controlled, which greatly reduces the installation and later maintenance costs of multiple cylinders. In addition, the two pyramidal surfaces of the push block 410 transmit a pushing force to the support rollers, so that the continuously adjustment to the pivot angle of the clamping arm can be realized. By adjusting the extension length of the hydraulic cylinder of the first drive unit 300, the volume of the clamping space formed by the first clamping unit 500 can be adjusted, to meet the guiding requirements for monopile foundations with different diameters. The monopile foundation guiding device according to the first embodiment of the present disclosure has a simple structure, so that the manufacturing period is shortened, and the cost is greatly reduced.

FIG. 6 to FIG. 9 illustrate a monopile foundation guiding device according to a second embodiment of the present disclosure. Compared with the monopile foundation guiding device according to the first embodiment of the present disclosure, the monopile foundation guiding device according to the second embodiment of the present disclosure may further include a second guide unit 2000. The second guide unit 2000 is spaced apart from the first guide unit 1000 by a predetermined distance in the height direction. The second guide unit 2000 may be mounted below the first guide unit 1000 (but not limited thereto), to realize the double-layer guide function for the monopile foundation.

Figure 6:
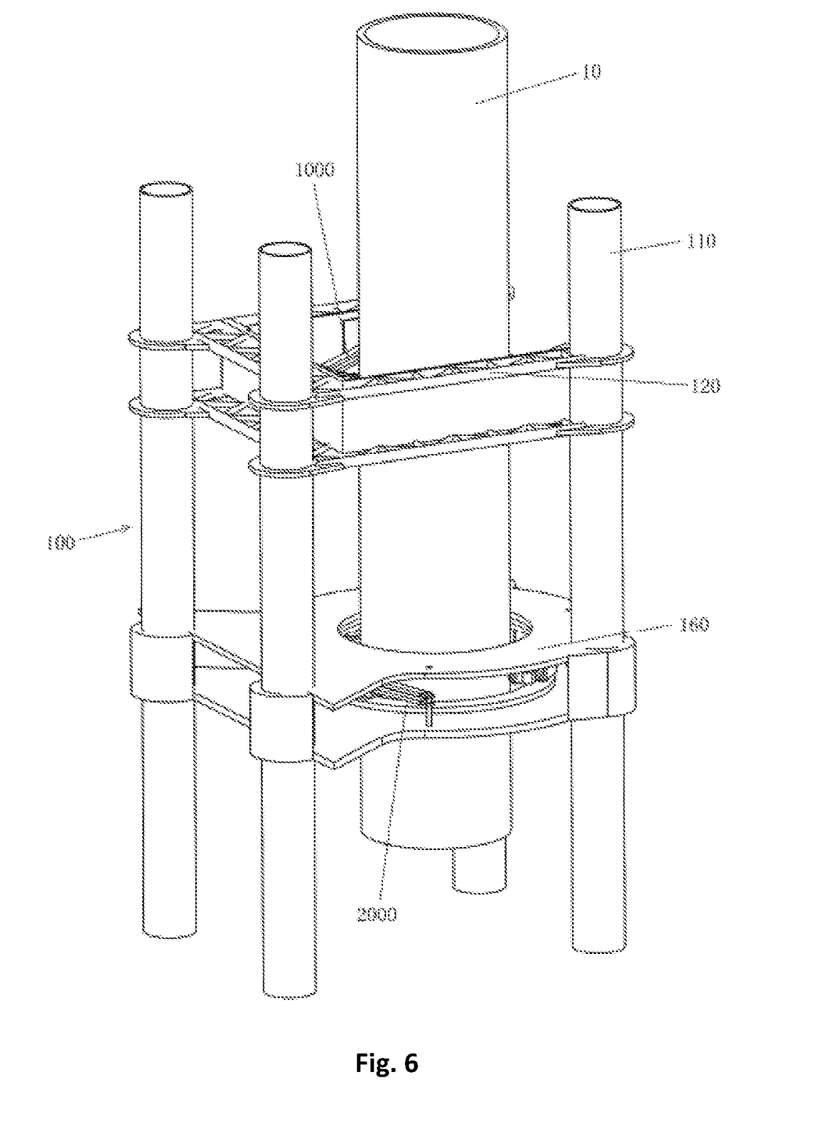
FIG. 6 is a perspective view of a monopile foundation guiding device according to a second embodiment of the present disclosure.

Specifically, the monopile foundation guiding device according to the second embodiment of the present disclosure may include a guide support frame 100, and a first guide unit 1000 and a second guide unit 2000, which are disposed on the guide support frame 100. The guide support frame 100 includes multiple positioning piles 110, and a first support platform 120 and a second support platform 160, which are fixed on the positioning piles 110. The second guide unit 2000 is mounted on the second support platform 160.

The first guide unit in the monopile foundation guiding device according to the second embodiment of the present disclosure has the same structure with the first guide unit in the monopile foundation guiding device according to the first embodiment of the present disclosure. Therefore, only the parts different from the monopile foundation guiding device of the first embodiment are described below with reference to FIG. 6 to FIG. 9. That is, only the second support platform 160 and the second guide unit 2000 are described.

Figure 7:
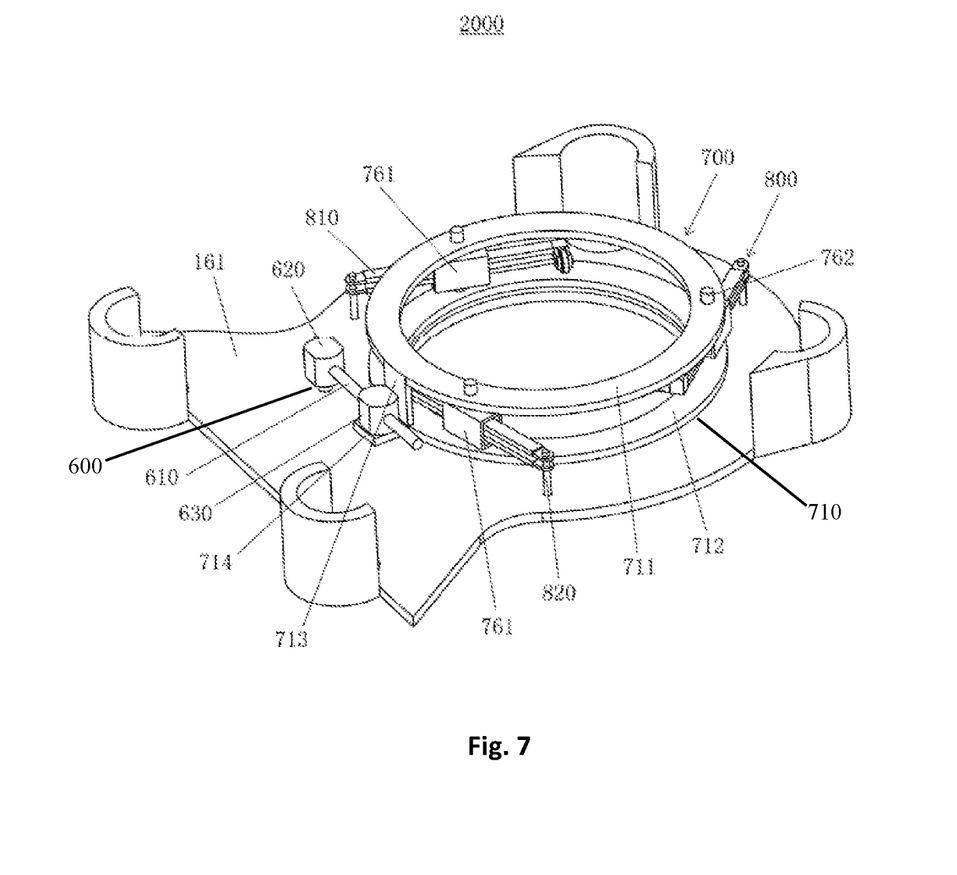
FIG. 7 is a perspective view of a second guide unit of the monopile foundation guiding device according to the second embodiment of the present disclosure.

As shown in FIG. 7, the second support platform 160 includes a support plate 161. A through hole for the monopile foundation 10 to pass through is provided in the middle of the support plate 161, and the diameter of the through hole is larger than the diameter of the monopile foundation 10. Although the support plate 161 shown in the Figures is in the shape of a plate, the support plate 161 may also be formed of a truss as long as the support function for the second guide unit 2000 can be satisfied.

Figure 8:
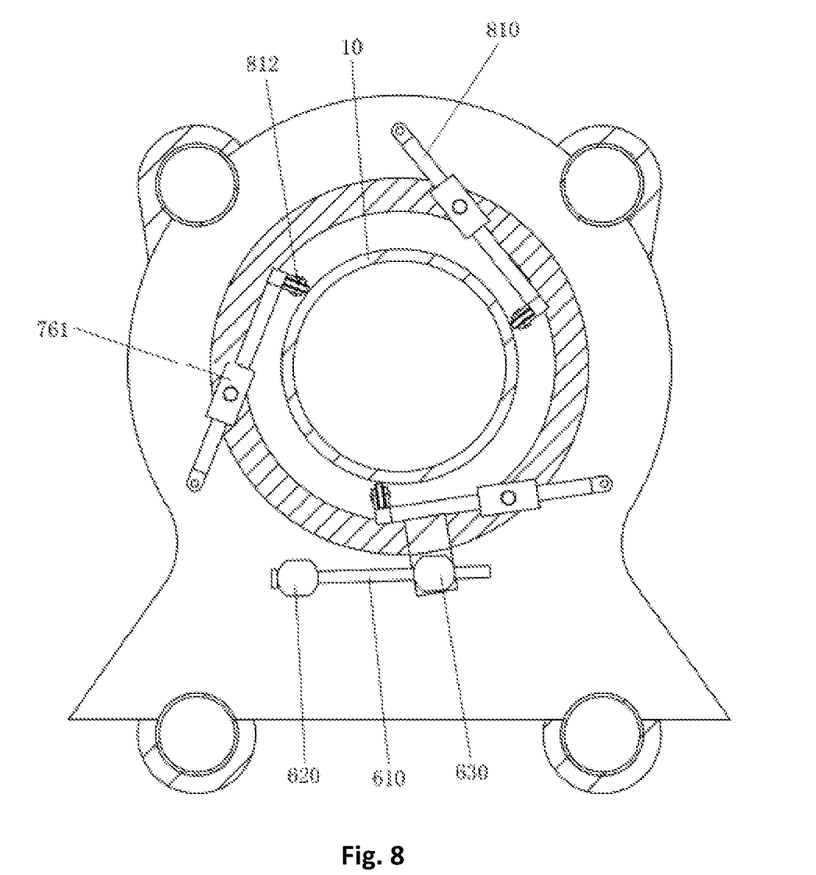
FIG. 8 is a top view of a second guide unit of the monopile foundation guiding device according to the second embodiment of the present disclosure, where the second clamping unit is in a closed state.
Figure 9:
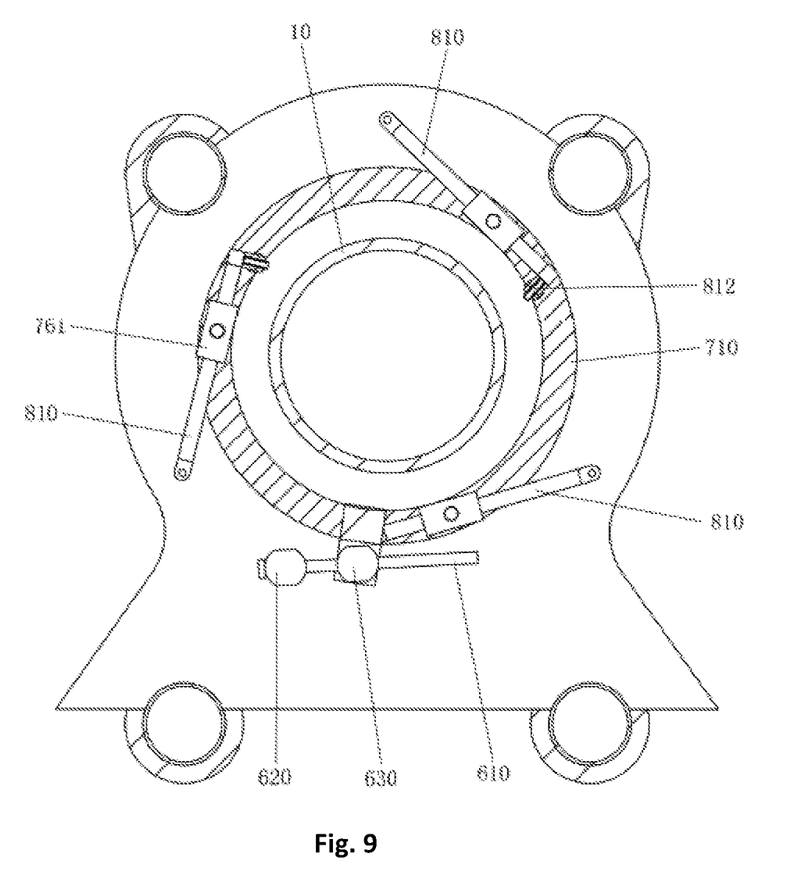
FIG. 9 is the top view of a second guide unit of the monopile foundation guiding device according to the second embodiment of the present disclosure, where the second clamping unit is in an open state.

The second guide unit 2000 includes a second drive unit 600, a second transmission unit 700 and a second clamping unit 800. The second transmission unit 700 may include an annular frame 710, and the second clamping unit 800 may include multiple clamping arms 810. The multiple clamping arms 810 may be symmetrically arranged along the circumferential direction, and a clamping space for accommodating the monopile foundation 10 is formed between the clamping arms 810. The multiple clamping arms 810 are respectively inserted into the annular frame 710. The second drive unit 600 can push the annular frame 710 to rotate, thereby driving the clamping arms 810 to pivot synchronously through the annular frame 710. With the pivoting of the clamping arm 810, the second clamping unit 800 is closed or opened to apply or remove the clamping force on the monopile foundation 10.

The second drive unit 600 may include a screw driving structure, specifically, may include a screw rod 610, a screw driving motor (not shown), a first screw support 620 and a second screw support 630.

The first screw support 620 can be mounted on the second support platform 160 and may rotate relative to the second support platform 160. A pivot shaft can be provided at the lower end of the first screw support 620, and the first screw support is connected to the support plate 161 of the first support platform 160 through the pivot shaft. One end of the screw rod 610 is inserted into the first screw rod support 620, and a screw driving motor can be mounted in the first screw rod support 620 to drive the screw rod 610 to rotate.

A horizontal threaded through hole can be provided in the second screw support 630, and the other end of the screw rod 610 can pass through the horizontal threaded through hole of the second screw support 630 and be thread engaged with the second screw support 630. The second screw support 630 is rotatably mounted to the annular frame 710.

The annular frame 710 is annular as a whole, with a circular through hole in the middle, and the diameter of the circular through hole is larger than the diameter of the monopile foundation 10, so that the monopile foundation 10 can pass through. The annular frame 710 can rotate relative to the second support platform 160 in a horizontal plane, specifically, with the axis of the monopile foundation 10 as the rotation center.

The second screw support 630 is rotatably mounted to the outer edge of the annular frame 710. As an example, a convex plate 714, which extends toward the outside of the annular frame 710 in the horizontal direction, is provided at the outer peripheral edge of the annular frame 710. The second screw support 630 is rotatably mounted on the convex plate 714.

A vertical insertion hole may be provided at the lower end of the second screw support 630. The convex plate 714 may be provided with a pin, which is able to be inserted into the insertion hole at the lower part of the second screw support 630, so that the second screw support 630 is able to rotate on the convex plate 714. The vertical insertion hole in the second screw support 630 is located below the horizontal threaded through hole, to prevent the pin inserted into the lower part of the second screw support 630 from interfering with the screw 610 inserted into the horizontal threaded through hole.

When the screw driving motor drives the screw rod 610 to rotate, the engagement position of the screw rod 610 and the second screw support 630 changes, so that the second screw support 630 drives the annular frame 710 to rotate through the convex plate 714.

FIG. 7 shows a perspective view of the second guide unit 2000, and FIG. 8 and FIG. 9 show a top view of the second guide unit 2000. In FIG. 8 and FIG. 9, to show the structure of the clamping unit 800 more clearly, the upper layer portion (upper layer annular plate) of the annular frame 710 is removed. Hereinafter, the specific structure of the annular frame 710 is described in detail with reference to FIG. 7 to FIG. 9.

The annular frame 710 may include an annular plate and a sleeve 761 mounted on the annular plate. To stably support and transmit rotational torque, the annular plate may include a first annular plate 711 on an upper layer and a second annular plate 712 on a lower layer that are coaxially arranged. The intermediate connecting plate 713 connects the first annular plate 711 on the upper layer and the second annular plate 712 on the lower layer as a whole. The intermediate connecting plate 713 may be provided in multiple sections, extending along the axial direction of the annular frame 710, and spaced apart in the circumferential direction of the annular frame 710. However, the connection mode of the first annular plate 711 on the upper layer and the second annular plate 712 on the lower layer is not limited to this, and a structure in which multiple connecting columns are used to connect the first annular plate and the second annular plate up and down as a whole may be adopted.

The sleeve 761 is disposed in the horizontal direction, and may be disposed between the first annular plate 711 and the second annular plate 712. The upper and lower sides of the sleeve 761 may also be provided with sleeve pivot shafts 762, and the sleeve pivot shafts 762 extend in the vertical direction (parallel to the axial direction of the annular frame). One end of the sleeve pivot shaft is combined with the annular plate, and the other end of the sleeve pivot shaft is combined with the sleeve 761, so that the sleeve 761 can be connected to the annular plate through the sleeve pivot shaft 762, stably supported by the annular plate, and is able to rotate around the sleeve pivot shaft 762. When the annular plate rotates, the sleeve 761 can move with the annular plate in the circumferential direction of the annular plate, and also pivot relative to the annular plate to effectively transmit the torque to the clamping arm 810.

The number of clamping arms 810 may be at least two, in this case, an arc-shaped clamping plate may be provided at the free end of the clamping arm 810, and a pressing roller may be arranged on the inner side of the arc-shaped clamping plate, to be in rolling contact with the outer surface of the monopile foundation while surrounding a part of the outer peripheral surface of the monopile foundation.

In the example shown in the drawings of the present disclosure, the second clamping unit 800 includes three clamping arms 810. The first end of the clamping arm 810 is pivotally connected to the second support platform 160. Specifically, the clamping arm hinge seat 820 can be fixedly mounted on the second support platform 160. The first end of the clamping arm 810 is connected to the clamping arm hinge seat 820, to be able to rotate about the clamping arm hinge seat 820. The second end of the clamping arm 810 passes through the sleeve 761 and protrudes from the sleeve 761 by a predetermined length. The second end of the clamping arm 810 can be connected to a pressing roller 812, to be in rolling contact with the outer surface of the monopile foundation 10 through the pressing roller 812. The clamping arm 810 can be a rigid straight link. To ensure the strength of the clamping arm 810, the rigid straight link can be set as a double-layer structure, that is, two straight links connected in parallel up and down are used as one clamping arm 810. The cross-section of the sleeve 761 may be circular or square, as long as it is compatible with the shape of the clamping arm 810 and does not affect the front and rear movement of the clamping arm 810 in the sleeve 761.

When the screw driving motor rotates, the screw rod 610 pushes the annular frame 710 to rotate through the second screw support 630. The annular frame 710 drives the clamping arm 810 to pivot around the clamping arm pivot axis through the sleeve 761. The pressing roller 812 moves toward or away from the clamping space, thereby adjusting the volume of the space that the monopile foundation 10 can pass through.

When the monopile foundation 10 needs to be hoisted and inserted into the annular frame 710, the pressing roller 812 can be driven to move outward. When the monopile foundation 10 has been inserted into the annular frame 710, the clamping arm 810 can be driven to pivot. The monopile foundation 10 is gripped by applying compressive force to the monopile foundation 10 at multiple positions by the pressing rollers 812. Similarly, the second guide unit according to the second embodiment of the present disclosure can push the annular structure to rotate by a drive unit, and can push the three clamping arms to pivot synchronously through the annular structure, so that each pressing roller 812 can press against or release the monopile foundation 10 synchronously, thus realizing the coaxial precise adjustment function.

Although the second drive unit 600 is embodied as the screw drive structure in the second guide unit, the second drive unit 600 is not limited to the screw drive structure, and may also be embodied as a gear-rack drive structure. Specifically, a gear may be provided on the outer ring of the annular frame 710, and a rack may be provided on the second support platform 160 to mesh with the gear. By moving the rack back and forth, the gear is driven to rotate, thus driving the annular structure to rotate. Similarly, a single drive unit may synchronously operate multiple clamping arms. Obviously, the installation positions of the driving gear and the driving rack can be interchanged, as long as the annular structure can be driven to rotate.

In the monopile foundation guiding device according to the second embodiment of the present disclosure, the first guide unit and the second guide unit are arranged in the vertical direction, and the two units can work synchronously, so that the verticality of the upper and lower layers can be adjusted synchronously, and the verticality of the monopile foundation can be more accurately determined. In addition, through the redundant design of the verticality adjustment structure of the upper and lower layers, the hydraulic drive and the mechanical screw structure complement each other. If one of the adjustment structures fails, the other adjustment structure can also realize the high-precision verticality adjustment process.

In the second embodiment of the present disclosure, the first guide unit 1000 and the second guide unit 2000 are arranged up and down. However, both the first guide unit 1000 and the second guide unit 2000 can be operated independently, and both of them can realize the function of synchronously adjusting the verticality of the monopile foundation. When arranging the upper and lower multi-layer guiding structure, it is not limited to arrange the first guide unit 1000 and the second guide unit 2000 in upper and lower layers. Instead, multiple first guide units 1000 can be arranged up and down, and multiple second guide units 2000 can also be arranged up and down, which can also ensure the precise verticality guiding function of the monopile foundation through the design of the multi-layer adjustment structure.

According to the embodiment of the present disclosure, unlike the conventional guide device in which the cylinder is arranged on the top of the platform, the drive unit of the monopile foundation guiding device according to the embodiment of the present disclosure is arranged at the bottom of the platform. The operator can manipulate the cylinder and the screw drive structure at the bottom of the platform, which greatly reduces the risk of personnel who manipulates the cylinder falls into the sea.

According to the monopile foundation guiding device disclosed by the present disclosure, the monopile foundation can be guided, clamped and righted in the installation process of the monopile foundation by the monopile foundation guiding device, so as to ensure that the monopile foundation is vertically piled into the seabed and prevent the monopile foundation from deflecting in the piling process. When applying the clamping force to the monopile foundation, for each guide unit, the clamping force of each clamping arm can be simultaneously adjusted only by operating a single drive structure. Compared with the conventional guiding device, the steps of stopping the hammer and measuring the verticality of the monopile for times during the monopile driving process can be omitted, which greatly improves the pile sinking efficiency. In the case of using multiple layers of guide units to conduct alignment at the same time, the upper and lower guide units can be operated synchronously through coaxial concentricity to ensure accurate verticality. The structure is simple, a large number of cylinders are omitted, the maintenance is convenient, and the structure cost is low.

Although the present application has been particularly shown and described with reference to the exemplary embodiments thereof, it should be understood by those skilled in the art that various changes in form and details can be made in the present application without departing from the spirit and scope of the present application as defined by the claims.

The invention claimed is:

1. A device for guiding a monopile wind turbine foundation, comprising:
at least one guide unit comprising a drive unit, a transmission unit comprising a push block, and a clamping unit,
wherein:
the clamping unit comprises at least two clamping arms, wherein a clamping space for clamping the monopile wind turbine foundation is formed between the at least two clamping arms, and
the drive unit transmits power to the transmission unit by moving the push block of the transmission unit linearly away from or toward the clamping space, causing the transmission unit to drive the at least two clamping arms to operate synchronously to open or close the clamping unit.

2. The device according to claim 1, wherein:
the drive unit pushes the push block to close the first clamping unit to hold the monopile wind turbine foundation.

3. The device according to claim 1, wherein:
the push block comprises a first pyramidal surface and a second pyramidal surface disposed opposite to each other,
the clamping unit comprises a first clamping arm and a second clamping arm,
a first support roller is provided at one end of the first clamping arm,
a second support roller is provided at one end of the second clamping arm,
the first support roller is supported on the first pyramidal surface,
the second support roller is supported on the second pyramidal surface, and
when the push block moves toward the clamping space, the first pyramidal surface and the second pyramidal surface respectively exert pushing force on the first support roller and the second support roller to pivotally close the first clamping arm and the second clamping arm.

4. The device according to claim 1, wherein:
the push block comprises a first inclined surface,
the drive unit comprises a hydraulic cylinder and a wedge connected to one end of the hydraulic cylinder,
the wedge has a second inclined surface,
the second inclined surface and the first inclined surface face to and contact with each other, and
when the hydraulic cylinder extends to push the wedge to move, the wedge pushes the push block to move toward the clamping space.

5. The device according to claim 3, wherein:
a first pressing roller is provided at the other end of the first clamping arm,
a second pressing roller is provided at the other end of the second clamping arm,
the first clamping unit further comprises a third pressing roller,
the third pressing roller is arranged on one side of the push block facing the clamping space, and
the first pressing roller, the second pressing roller, and the third pressing roller are configured to simultaneously hold or release the monopile wind turbine foundation.

6. The device according to claim 4, wherein:
one of the first inclined surface and the second inclined surface is provided with a sliding rail, and the other of the first inclined surface and the second inclined surface is provided with a sliding groove, wherein the sliding rail is engaged in the sliding groove and slidable in the sliding groove.

7. The device according to claim 3, wherein:
at least one roller groove is provided in the first pyramidal surface or the second pyramidal surface, wherein the first support roller or the second support roller is engaged in the at least one roller groove and rollable in the at least one roller groove.

8. The device according to claim 3, further comprises a support platform, wherein:
the support platform is formed into a concave structure with one side open, and comprises a first inner side wall, a second inner side wall and a third inner side wall located at both sides of the first inner side wall,
the drive unit is mounted on the first inner side wall,
the first clamping arm and the second clamping arm each comprises a rigid bend link,
a middle part of the first clamping arm is hinged to the second inner side wall, and
a middle part of the second clamping arm is hinged to the third inner side wall.

9. The device according to claim 4, wherein an inclination angle of the first inclined surface or the second inclined surface is in a range of 10 degrees to 30 degrees.

10. The device according to claim 1, wherein the at least one guide unit comprises first and second guide units, wherein:
the first guide unit comprises the drive unit, the transmission unit, and the clamping unit,
the second guide unit comprises a second drive unit, a second transmission unit, and a second clamping unit,
the second transmission unit comprises an annular frame,
the second damping unit comprises a plurality of clamping arms,
the plurality of clamping arms of the second clamping unit are inserted into the annular frame, and
the second drive unit pushes the annular frame to rotate, so as to drive the plurality of clamping arms of the second clamping unit to pivot synchronously through the annular frame.

11. The device according to claim 10, further comprises a support platform on which the second guide unit is mounted, wherein:
the annular frame comprises an annular plate and a sleeve provided on the annular plate, wherein the sleeve is pivotally connected to the annular plate by a sleeve pivot shaft,
at least one of the plurality of clamping arms of the second clamping unit comprises a rigid straight link,
a first end of the at least one of the plurality of clamping arms of the second clamping unit is hinged to the support platform-through a clamping arm hinge seat,
a second end of the at least one of the plurality of clamping arms of the second clamping unit passes through the sleeve, and
when the annular frame rotates, the sleeve is configured to drive the rigid straight link to rotate around the clamping arm hinge seat.

12. The device according to claim 10, wherein:
the second drive unit comprises a screw rod, a screw driving motor, a first screw support and a second screw support,
the screw driving motor is mounted in the first screw support,
a first end of the screw rod is inserted into the first screw support,
a second end of the screw rod passes through a horizontal thread through hole in the second screw support,
the second screw support is rotatably mounted on the annular frame, and
the screw driving motor drives the screw rod to rotate, so as to drive the annular frame to rotate through the second screw support.

13. The device according to claim 12, wherein a convex plate is provided at an outer edge of the annular frame, wherein the second screw support is rotatably mounted on the convex plate.

14. The device according to claim 11, wherein:
the second drive unit comprises a drive gear and a drive rack that mesh with each other, wherein one of the drive gear and the drive rack is mounted to an outer ring of the annular frame, wherein the other of the drive gear and the drive rack is mounted to the support platform.

15. The device according to claim 11, wherein:
the annular plate comprises a first annular plate and a second annular plate which are coaxially arranged, wherein the sleeve is located between the first annular plate and the second annular plate, wherein upper and lower sides of the sleeve are respectively connected with the first annular plate and the second annular plate through the sleeve pivot shaft.

16. The device according to claim 2, wherein the at least one guide unit comprises first and second guide units, wherein:
the first guide unit comprises the drive unit, the transmission unit, and the clamping unit,
the second guide unit comprises a second drive unit, a second transmission unit, and a second clamping unit,
the second transmission unit comprises an annular frame,
the second clamping unit comprises a plurality of clamping arms,
the plurality of clamping arms of the second clamping unit are inserted into the annular frame, and
the second drive unit pushes the annular frame to rotate, so as to drive the plurality of clamping alms of the second clamping unit to pivot synchronously through the annular frame.

17. The device according to claim 3, wherein the at least one guide unit comprises first and second guide units, wherein:
the first guide unit comprises the drive unit, the transmission unit, and the clamping unit,
the second guide unit comprises a second drive unit, a second transmission unit, and a second clamping unit,
the second transmission unit comprises an annular frame,
the second clamping unit comprises a plurality of clamping aims,
the plurality of clamping arms of the second clamping unit are inserted into the annular frame, and
the second drive unit pushes the annular frame to rotate, so as to drive the plurality of clamping aims of the second clamping unit to pivot synchronously through the annular frame.

18. The device according to claim 4, wherein the at least one guide unit comprises first and second guide units, wherein:
the first guide unit comprises the drive unit, the transmission unit, and the clamping unit,
the second guide unit comprises a second drive unit, a second transmission unit, and a second clamping unit,
the second transmission unit comprises an annular frame,
the second clamping unit comprises a plurality of clamping arms,
the plurality of clamping arms of the second clamping unit are inserted into the annular frame, and
the second drive unit pushes the annular frame to rotate, so as to drive the plurality of clamping arms of the second clamping unit to pivot synchronously through the annular frame.

19. The device according to claim 5, wherein the at least one guide unit comprises first and second guide units, wherein:
the first guide unit comprises the drive unit, the transmission unit, and the clamping unit,
the second guide unit comprises a second drive unit, a second transmission unit, and a second clamping unit,
the second transmission unit comprises an annular frame,
the second clamping unit comprises a plurality of clamping arms,
the plurality of clamping arms of the second clamping unit are inserted into the annular frame, and
the second drive unit pushes the annular frame to rotate, so as to drive the plurality of clamping arms of the second clamping unit to pivot synchronously through the annular frame.

20. The device according to claim 8, wherein the at least one guide unit comprises first and second guide units, wherein:
the first guide unit comprises the drive unit, the transmission unit, and the clamping unit,
the second guide unit comprises a second drive unit, a second transmission unit, and a second clamping unit,
the second transmission unit comprises an annular frame,
the second clamping unit comprises a plurality of clamping arms,
the plurality of clamping arms of the second clamping unit are inserted into the annular frame, and
the second drive unit pushes the annular frame to rotate, so as to drive the plurality of clamping arms of the second clamping unit to pivot synchronously through the annular frame.

* * * * *